Figure 1:
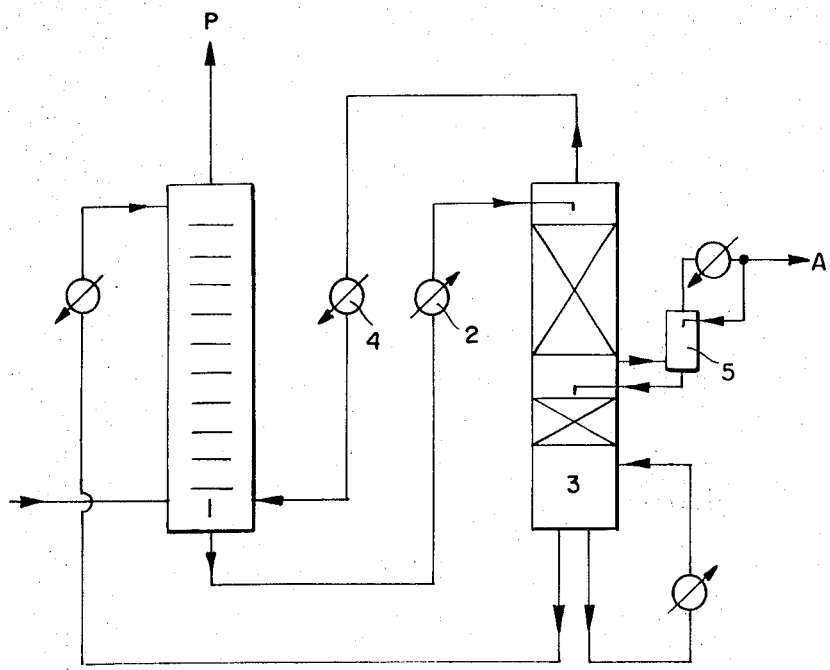

United States Patent

[11] 3,617,535

[72] Inventors Hans-Martin Weitz
Frankenthal;
Ernst Fuerst, Neustadt, both of Germany
[21] Appl. No. 3,338
[22] Filed Jan. 16, 1970
[45] Patented Nov. 2, 1971
[73] Assignee Badische Anilin- & Soda-Fabrik Aktiengesellschaft
Ludwigshafen Rhineland, Pfalz, Germany
[32] Priority Jan. 18, 1969
[33] Germany
[31] P 19 02 461.4

[54] RECOVERY OF AROMATIC HYDROCARBONS FROM HYDROCARBON MIXTURES BY SELECTIVE EXTRACTION AND/OR EXTRACTIVE DISTILLATION
4 Claims, 2 Drawing Figs.

[52] U.S. Cl. .................................................. 208/323, 208/326, 260/674 SE
[51] Int. Cl. .................................................. C10g 21/02, C10g 2/20
[50] Field of Search ..................................... 208/323, 326; 260/674 SE

[56] References Cited
UNITED STATES PATENTS
3,366,568  1/1968  Eisenlohr et al. ............. 208/323
FOREIGN PATENTS
232,167  3/1964  Austria ......................... 208/326

*Primary Examiner* — Herbert Levine
*Attorney* — Johnston, Root, O'Keeffe, Keil, Thompson & Shurtleff ABSTRACT: Recovery of aromatic hydrocarbons by selective extraction of hydrocarbon mixtures containing olefins and naphthenes in addition to aromatic and paraffinic hydrocarbons. The extractant is a mixture of an N-alkylpyrrolidone and a compound of the formula where Y is alkylene or alkenylene having two or three carbon atoms or o-phenylene which may be partially hydrogenated and R is alkylene having two to 12 carbon atoms.

PATENTED NOV 2 1971          3,617,535

INVENTORS:
HANS-MARTIN WEITZ
ERNST FUERST

BY: *Johnston, Root, O'Keeffe, Keil, Thompson & Shurtleff*
ATT'YS

RECOVERY OF AROMATIC HYDROCARBONS FROM HYDROCARBON MIXTURES BY SELECTIVE EXTRACTION AND/OR EXTRACTIVE DISTILLATION

This invention relates to a process for the recovery of aromatic hydrocarbons by selective extraction of hydrocarbon mixtures containing olefins and naphthenes in addition to aromatic and paraffinic hydrocarbons.

It is known to separate hydrocarbon mixtures comprising paraffinic and aromatic components into raffinates rich in paraffins and extracts rich in aromatic compounds, by means of solvents. Suitable solvents for this purpose are, for example N-alkylpyrrolidones and N-hydroxyalkylpyrrolidones, tetramethyl sulfone, propylene carbonate, dicarboxylic acid imides, morpholine and derivatives thereof, dimethylsulfoxide and di-, tri- and tetraethylene glycols.

These solvents are used to obtain as high a concentration of aromatic compounds in the extract as possible. A desirable property of the suitable solvents is their resistance to hydrolytic influences under the conditions of extraction. This is particularly valuable when water is added to the solvent, since it has been shown that the addition of water frequently improves the selectivity of the extractant. The use of mixtures of said solvents, for example a mixture of N-methylpyrrolidone and glycol, as the extractant is also known.

In some cases, however, the selectivity of the known solvents or mixtures thereof with auxiliaries such as, in particular, water of with other solvents is still inadequate.

The hydrocarbon feeds normally used commercially are usually produced by petrochemical processes and often contain, apart from aromatic compounds and paraffins, such large quantities of olefins and/or naphthenes that the solvent used for the extraction of the aromatic compounds and their recovery in a high degree of purity must show high selectivity, that is, it must be a good solvent for aromatic compounds whilst exhibiting a high separation efficiency between aromatic compounds and olefins or naphthenes. Where the solvent or solvent mixture used for extraction shows inadequate selectivity, it is frequently necessary to selectively hydrogenate the starting hydrocarbon mixture in order to saturate the unsaturated compounds before the aromatic compounds are separated. This additional step is undesirable, however. There has thus been the desire to find an extractant which shows high selectivity in the case of hydrocarbon mixtures which are separated only with difficulty. In addition, the extractant used should still show high selectivity at a high hydrocarbon loading, that is, at a high ratio of hydrocarbons to solvent by volume.

We have now found that aromatic compounds may be simply obtained in a high degree of purity and in good yields by the extraction of hydrocarbon mixtures optionally containing olefins and/or naphthenes in addition to aromatic and paraffinic components, without any previous selective hydrogenation, when extraction is carried out in the usual manner using as extractant mixtures containing as essential components:

a. an N-alkylpyrrolidone, preferably N-methylpyrrolidone, and
b. one or more compounds of formula I:

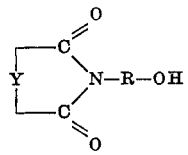

where Y stands for an alkylene or alkenylene group having two or three carbon atoms or an optionally partly hydrogenated o-phenylene group and R stands for a straight-chain or branched-chain alkylene group having two to 12, preferably two to six, and in particular two, carbon atoms.

Suitable N-alkylpyrrolidones are, in particular, those containing a short-chain alkyl group, particularly N-methylpyrrolidone, but N-substituted or C-substituted pyrrolidones of up to 15 carbon atoms are also useful.

For particular simplicity of production the components (b) preferably contain a hydroxyethyl group. Thus specific examples of such components are the N-hydroxyethyl derivates of maleimide, succinimde, glutarimide, phthalimide or the amide of tetrahydrophthalic acid. Of these, N-hydroxyethyl succinimide is particularly suitable. Due to their ready availability those mixtures of derivatives of dicarboxylic acid imides are particularly important, which are produced from the mixture of dicarboxylic acids obtained in the production of adipic acid by the oxidation of cyclohexane, that is, mixtures of N-hydroxyethyl succinimide and N-hydroxyethyl glutarimide optionallly containing N,N'-di-hydroxyethyladipamide if not separated or only incompletely separated.

The recovery of aromatic hydrocarbons according to the process of the invention may be carried out by any of the known methods of separating hydrocarbons by means of selective solvents. Thus, apart from liquid-liquid extraction or countercurrent extraction, use may also be made of the methods of extractive distillation or countercurrent scrubbing. It may also be convenient to combine these methods.

To obtain pure aromatic compounds it is beneficial, in the case of liquid-liquid extraction, to operate with a recycled stream of, for example, aliphatic hydrocarbons such as propane, butane, pentane or hexane. The ratio of component (a) to (b) in the solvent mixture used is selected according to the composition of the hydrocarbon mixture to be extracted, the desired purity of the recovered aromatic compounds, the nature of the solvents used and the kind of separating conditions employed. In general, the ratio of component (a) to (b) will vary between 1:9 and 9:1. In the case of liquid-liquid extraction, which may optionally be combined with an extractive distillation step, there will be used at least 30 percent and preferably at least 40 percent by weight of the hydroxyl group-containing component (b) in the mixture. We have found it beneficial in some cases to include small quantities of water, for example, 1 to 10 percent and preferably 1 to 5 percent by weight, in the mixture.

Suitable feedstocks for the recovery of aromatic compounds such as benzene, toluene, xylene, ethylbenzene, styrene, naphthalene and other derivatives of benzene and naphthalene, are a wide range of mineral oil fractions such as straight-run gasolines, cracked gasolines, pyrolysis gasolines, low-temperature coking gasolines, reformed gasolines, diesel oils, gas oils, lubricating oils or heavy oils.

The process may be carried out under normal pressure conditions or at an elevated pressure, for example, at 1 to 5 atmospheres. It is also possible to operate under reduced pressure. The temperature is generally between 0° C. and the boiling point of the solvent. The extraction will usually be carried out at room temperature or at a slightly elevated temperature such as 30° to 60° C. or higher, although lower temperatures such as 5° to 30° C. may also be used if desired. The extractants used in accordance with the invention have relatively high-boiling points, which provides them with the the added advantage, when used in the present process, that higher aromatic compounds may also be recovered.

The use of the separating process in practice is described with reference to FIGS. 1 and 2 which illustrate the two cases of greatest practical importance, liquid-liquid extraction and countercurrent washing.

Figure 2:
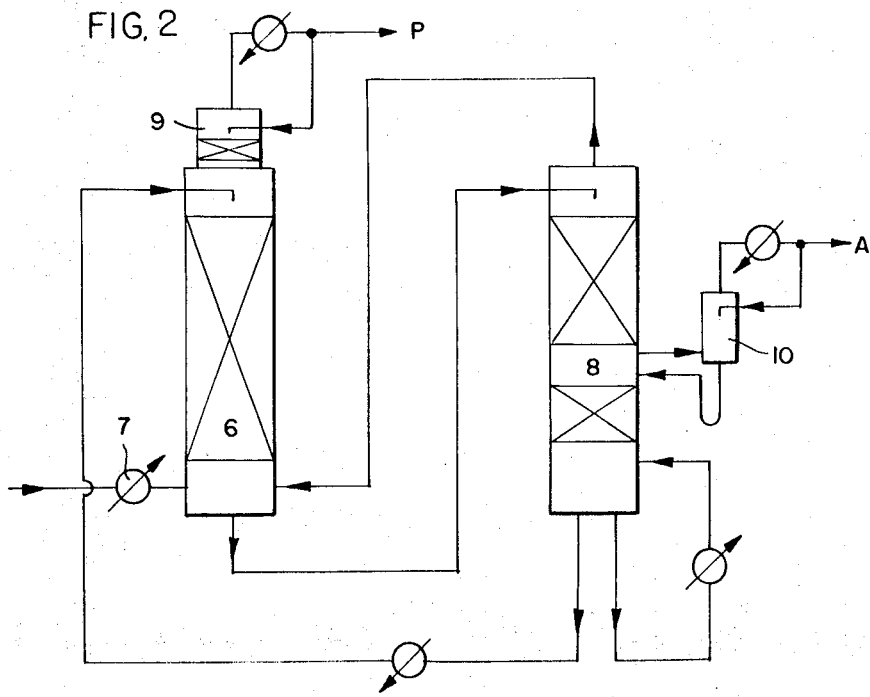

With reference to FIG. 1, the liquid feedstock is fed to the bottom end of an extraction column 1, the selective solvent containing components (a) and (b) being fed to the column at its top end. The hydrocarbons P devoid of aromatic compounds leave the column at its top end and are separated from small quantities of solvent which is recycled to the column. The solvent reaching the bottom end of the column is laden with hydrocarbons. It is warmed in the heat exchanger 2 and passed to the top of a distillation column 3. The vaporous hydrocarbon mixture occuring at the top of this column is condensed in the heat exchanger 4 and fed to the bottom end of column 1. At a suitable point of the column 3 the pure aromatic compounds A are withdrawn as a vaporous side stream and are washed free of solvent vapors in a small column 5, the washing liquid being a recycled portion of the condensed aromatic compounds. The solvent occuring as the bottoms in column 3 is cooled and reused for the extraction in column 1. In place of an extraction column, any other apparatus adapted for carrying out liquid-liquid extraction may be used, for example a mixer/separator unit.

In the case of the countercurrent washing method (FIG. 2) the extraction column 1 is replaced by a distillation column 6, to the bottom end of which the feedstock, vaporized in heat exchanger 7, is fed. The two heat exchangers used in FIG. 1 in the product lines interconnecting the separating columns are not required in the case of the columns 6 and 8 involving countercurrent washing. The nonaromatics (P) accumulating at the top of column 6 are washed free of traces of solvent in column 9, the washing liquid being a recycled portion of condensed overhead product. The aromatics (A) are washed free of solvent in the column 10 by means of a similar recycled stream of liquid aromatics.

EXAMPLE

A mixture comprising, by volume, 50 parts of n-heptane, 40 parts of benzene and 10 parts of cyclohexene is fed to one end of a 10-stage mixer/separator battery at the rate of 900 parts by volume per hour, whilst a mixture of 50 parts of N-methylpyrrolidone and 50 parts of N-hydroxyethyl succinimide v/v is fed to the other end of the apparatus at the rate of 300 parts by volume per hour. The solvent reaching the hydrocarbon feed-in end is laden with hydrocarbons, and this mixture of solvent and hydrocarbon is heated and fed to the top end of a bubble cap plate column (with 30 actual plates) having a heated base. The hydrocarbon mixture produced at the top of the column is condensed and mixed with the liquid hydrocarbon feedstock passing to the extraction battery. At the fifth plate from the bottom pure benzene is withdrawn as a vapor and is washed in a small column with a recycled stream of liquid product. The nonaromatic product obtained from the extraction contains, after removal of traces of solvent, about 84 percent v/v of n-heptane, 16 percent v/v of cyclohexene and less than 0.2 percent v/v of benzene, whilst the aromatic product contains less than 300 p.p.m. of n-heptane and cyclohexene.

We claim:

1. In a method for extracting aromatic hydrocarbons from hydrocarbon mixtures containing in addition to aromatic and paraffinic hydrocarbons optionally also olefins and naphthenes the improvement which comprises using as extractant a mixture of (a) an N-alkylpyrrolidone and
(b) a compound of the formula

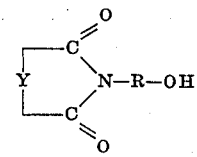

where Y stands for a member of the group consisting of alkylene, alkyenylene containing two or three carbon atoms and partially hydrogenated o-phenylene and R stands for an alkylene group of two to 12 carbon atoms.

2. A method as claimed in claim 1 wherein the extractant is a mixture in which the components (a) and (b) are present in the ratio of from 1:9 to 9:1.

3. A method as claimed in claim 1 wherein the extractant is a mixture containing at least 30 percent by weight of component (b).

4. A method as claimed in claim 1 wherein the extractant is a mixture of N-methylpyrrolidone and N-hydroxyethyl succinimide.

* * * * *